US012671169B2

(12) United States Patent
Peng et al.

(10) Patent No.: US 12,671,169 B2
(45) Date of Patent: Jun. 30, 2026

(54) ANTENNA STRUCTURE AND ELECTRONIC DEVICE

(71) Applicant: WISTRON NEWEB CORPORATION, Hsinchu (TW)

(72) Inventors: Yen-Tze Peng, Hsinchu (TW); Chun-Hsiang Chuang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 577 days.

(21) Appl. No.: 18/054,202

(22) Filed: Nov. 10, 2022

(65) Prior Publication Data

US 2023/0411828 A1 Dec. 21, 2023

(30) Foreign Application Priority Data

Jun. 21, 2022 (TW) ................................. 111122963

(51) Int. Cl.
*H01Q 1/22* (2006.01)
*H01Q 5/35* (2015.01)
*H01Q 5/378* (2015.01)

(52) U.S. Cl.
CPC ......... *H01Q 1/2291* (2013.01); *H01Q 1/2266* (2013.01); *H01Q 5/35* (2015.01); *H01Q 5/378* (2015.01)

(58) Field of Classification Search
CPC ...... H01Q 1/2291; H01Q 1/2266; H01Q 5/35; H01Q 5/378
See application file for complete search history.

(56) References Cited

U.S. PATENT DOCUMENTS 9,502,773 B2 11/2016 Tsai et al.
10,651,553 B2 * 5/2020 Lee ........................ H01Q 5/378
11,532,871 B2 * 12/2022 Zhou ...................... H01Q 1/243
2011/0254749 A1 * 10/2011 Amari ................. H01Q 9/0442 343/858
2019/0296446 A1 * 9/2019 Tseng ...................... H01Q 9/42
(Continued)

FOREIGN PATENT DOCUMENTS

CN 106299604 A 1/2017
CN 110620290 B 10/2020
(Continued)

*Primary Examiner* — Alexander H Taningco
(74) *Attorney, Agent, or Firm* — McClure, Qualey & Rodack, LLP

(57) ABSTRACT

An antenna structure and an electronic device are provided. The electronic device includes a housing and an antenna structure disposed in the housing. The antenna structure includes a radiating element, a first feeding element with a first feeding portion connected to the radiating element, a second feeding element with a second feeding portion connected to the radiating element, a grounding element connected to the radiating element and located between the first feeding element and the second feeding element, and a grounding branch with a first end connected to the second feeding portion and a second end connected to a ground plane. The first feeding element and the second feeding element are used for feeding respective signals to excite the radiating element to respectively generate a first radiation pattern and a second radiation pattern. The first radiation pattern is different from the second radiation pattern.

14 Claims, 8 Drawing Sheets

(56) References Cited

U.S. PATENT DOCUMENTS

| | | | | |
|---|---|---|---|---|
| 2021/0126365 | A1* | 4/2021 | Wan | H01Q 1/38 |
| 2021/0376459 | A1* | 12/2021 | Li | H01Q 9/0457 |
| 2022/0013909 | A1* | 1/2022 | Kim | H01Q 1/38 |
| 2022/0069468 | A1* | 3/2022 | Hsu | H01Q 5/20 |
| 2022/0255227 | A1* | 8/2022 | Kim | H01Q 1/38 |
| 2024/0322439 | A1* | 9/2024 | Meng | H01Q 7/00 |

FOREIGN PATENT DOCUMENTS

| | | | | |
|---|---|---|---|---|
| CN | 117394022 | A * | 1/2024 | H01Q 1/521 |
| TW | 201635642 | A | 10/2016 | |
| TW | 202005171 | A | 1/2020 | |

* cited by examiner

ANTENNA STRUCTURE AND ELECTRONIC DEVICE

CROSS-REFERENCE TO RELATED PATENT APPLICATION

This application claims the benefit of priority to Taiwan Patent Application No. 111122963, filed on Jun. 21, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an electronic device, and more particularly to an antenna structure and an electronic device capable of increasing isolation by adjusting radiation patterns.

BACKGROUND OF THE DISCLOSURE

Electronic devices like smart phones, tablet computers and laptop computers are normally equipped with multiple antennas for wireless communication in different frequency bands. Because signals generated by adjacent antennas would interfere with each other, an isolator is then placed in between the two antennas to increase isolation. However, due to the light and thin design trend of electronic devices, there is no excess space in the electronic device to place the isolator.

So, how to improve isolation through a structural design that does not require the addition of extra isolator to the antenna structure has become an issue to be overcome.

SUMMARY OF THE DISCLOSURE

In response to the above-referenced technical inadequacies, the present disclosure provides an antenna structure and an electronic device to effectively improve on the isolation issue between adjacent antennas associated with lack of space for isolator installation in conventional electronic devices.

In one aspect, the present disclosure provides an antenna structure, which includes a radiating element, a first feeding element, a second feeding element, a grounding element, and a grounding branch. The first feeding element has a first feeding portion and is connected with the radiating element through the first feeding portion. The second feeding element has a second feeding portion and is connected with the radiating element through the second feeding portion. The grounding element is connected with the radiating element and is located between the first feeding element and the second feeding element. The grounding branch has a first end and a second end. The first end is connected with the second feeding portion, and the second end is connected with a ground plane. The first feeding element is used for feeding a signal to excite the radiating element to generate a first radiation pattern. The second feeding element is used for feeding another signal to excite the radiating element to generate a second radiating pattern. The first radiation pattern is different from the second radiation pattern.

In another aspect, the present disclosure provides an electronic device, which includes a housing and an antenna structure disposed in the housing. The antenna structure includes a radiating element, a first feeding element, a second feeding element, a grounding element, and a grounding branch. The first feeding element has a first feeding portion and is connected with the radiating element through the first feeding portion. The second feeding element has a second feeding portion and is connected with the radiating element through the second feeding portion. The grounding element is connected with the radiating element and is located between the first feeding element and the second feeding element. The grounding branch has a first end and a second end. The first end is connected with the second feeding portion, and the second end is connected with a ground plane. The ground plane is electrically connected with the housing. The first feeding element is used for feeding a signal to excite the radiating element to generate a first radiation pattern. The second feeding element is used for feeding another signal to excite the radiating element to generate a second radiation pattern. The first radiation pattern is different from the second radiation pattern.

Therefore, through the design of the grounding element being located between the first feeding element and the second feeding element and the grounding branch being connected with the second feeding portion in the antenna structure and the electronic device provided by the present disclosure, the first radiation pattern generated by the first feeding element differs from the second radiation pattern generated by the second feeding element, and thus the isolation between the first antenna and the second antenna is enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
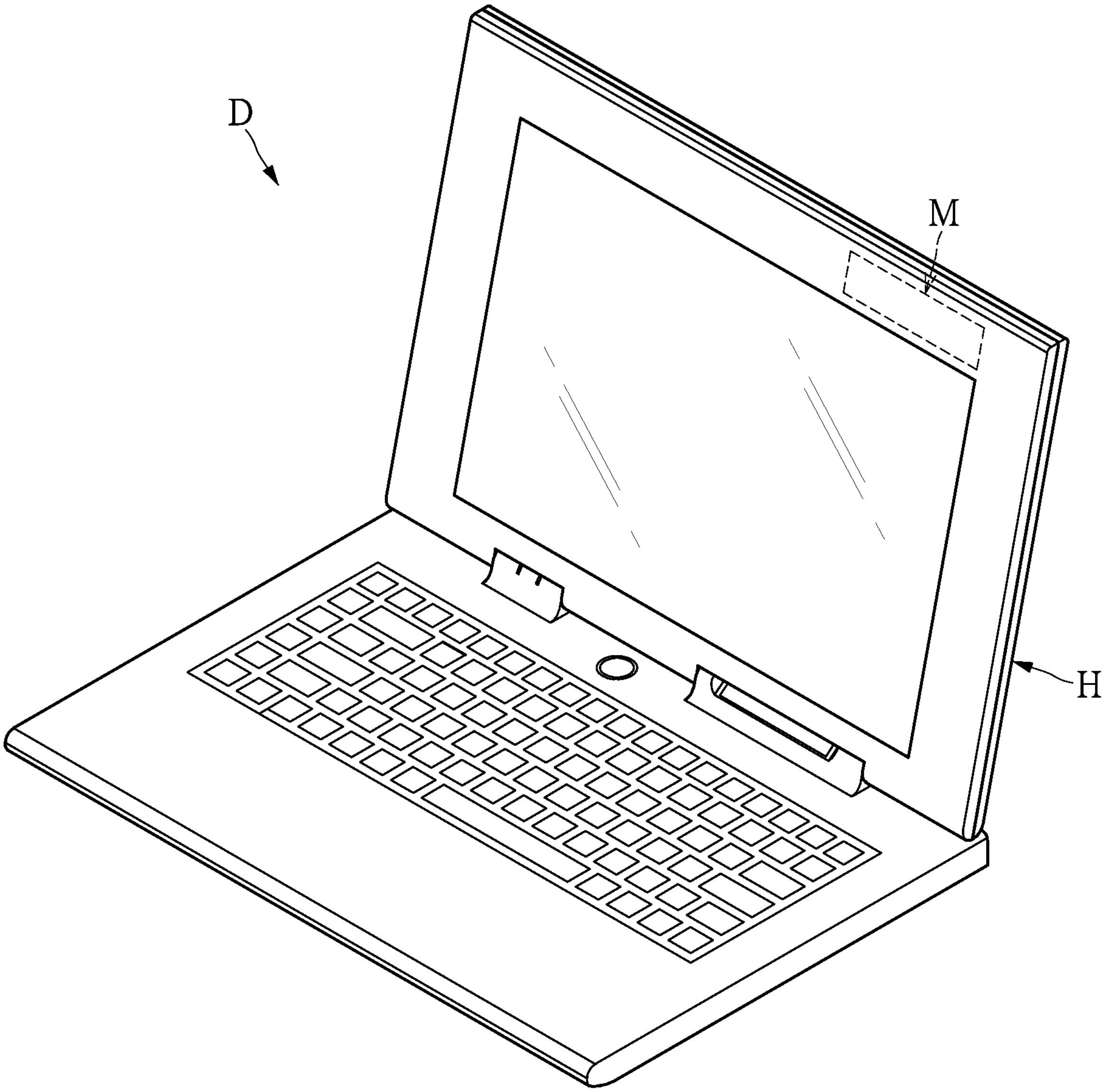
FIG. 1 is a perspective view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

In addition, the term “or”, as used herein, should include any one or a combination of the associated enlisted items, as the case may be. The term “connect” in the context of the present disclosure means there is a physical connection between two elements and is directly or indirectly connected. The term “couple” in the context of the present disclosure means there is no physical connection between two separated elements, and the two elements are instead connected by their electric field energy where the electric field energy generated by the current of one element excites the electric field energy of the other element.

First Embodiment

Referring to FIG. 1, the present disclosure provides an electronic device D, such as a laptop computer, but the present disclosure is not limited thereto. The electronic device D includes a housing H and an antenna structure M disposed in the housing H. The housing H may be made of metal.

Figure 2:
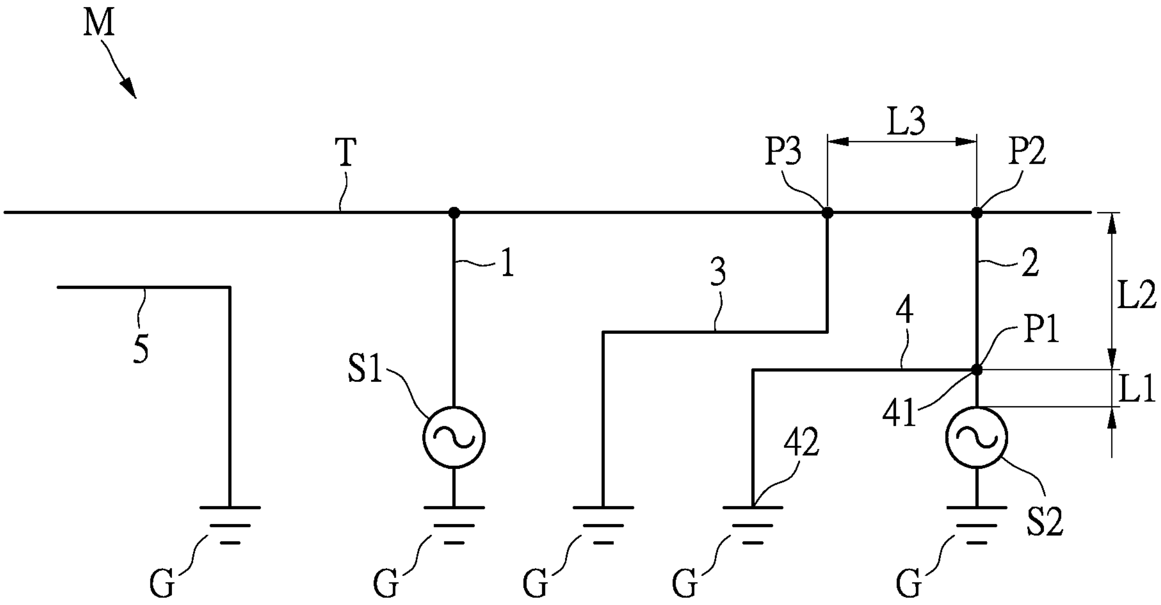
FIG. 2 is a schematic diagram of an antenna structure according to a first embodiment of the present disclosure.

Referring to FIG. 2, the antenna structure M according to a first embodiment includes a radiating element T, a first feeding element S1, a second feeding element S2, a grounding element 3, and a grounding branch 4. The first feeding element S1 has a first feeding portion 1. The first feeding element S1 is connected with the radiating element T through the first feeding portion 1. The first feeding element S1 and the radiating element T form a first antenna, such that the radiating element T is excited by a signal fed through the first feeding portion 1 of the first feeding element S1 so as to generate a first radiation pattern. The second feeding element S2 has a second feeding portion 2. The second feeding element S2 is connected with the radiating element T through the second feeding portion 2. The second feeding element S2 and the radiating element T form a second antenna, such that the second feeding element S2 feeds another signal through the second feeding portion 2 to excite the radiating element T to generate a second radiation pattern. The first radiation pattern is different from the second radiation pattern.

The grounding element 3 is connected with the radiating element T and is located between the first feeding element S1 and the second feeding element S2. The grounding branch 4 has a first end 41 and a second end 42. The first end 41 is connected with the second feeding portion 2, and the second end 42 is connected with a ground plane G. Specifically, the second end 42 is directly connected with the ground plane G. The ground plane G is, for example, a surface of the housing H or a metal piece electrically connected with the housing H, and the present disclosure is not limited thereby. It is to be noted that the antenna structure M shown in FIG. 2 (and that in subsequent FIG. 3 and FIG. 4) are mainly to present the relative locations and connections between each component and not to be used to limit the actual shape or size of each component.

For example, the first antenna that includes the first feeding element S1 and the radiating element T may be a long term evolution (LTE) antenna, a wireless wide area network (WWAN) antenna, a multi-in multi-out (MIMO) antenna, and the present disclosure does not limit the type of the first antenna. Moreover, in the present disclosure, the second antenna that includes the second feeding element S2 and the radiating element T is a wireless local area network (WLAN) antenna. The second feeding element S2 is used to excite the radiating element T to generate a first operating frequency band and a second operating frequency band. The first operating frequency band is the low frequency band generated by the WLAN antenna and has a frequency range of 2.4 GHz to 2.5 GHz. The second operating frequency band is the high frequency band generated by the WLAN antenna and has a frequency range between 5.15 GHz and 5.85 GHz. The first operating frequency band is lower than the second operating frequency band.

When the first antenna is a multiband antenna like an LTE antenna, the antenna structure M further includes a parasitic coupling element 5. The parasitic coupling element 5 is disposed close to or near the first feeding element S1. The first feeding element S1 is closer to the parasitic coupling element 5 than the second feeding element S2 is to the parasitic coupling element 5. The first feeding element S1, the radiating element T, and the parasitic coupling element 5 together form the first antenna. The first antenna is configured to generate a frequency range that is adjustable by coupling the parasitic coupling element 5 with the radiating element T.

Referring to FIG. 2, when the second antenna (WLAN antenna) generates the first operating frequency band, a first antenna path is formed, and when the second antenna generates the second operating frequency band, a second antenna path is formed. A path length of the first antenna path is greater than a path length of the second antenna path.

The path length of the first antenna path is equal to one half (½) of a wavelength of a lowest frequency in the first operating frequency band, which is 2.4 GHz. The path length of the second antenna path is equal to one half (½) of a wavelength of a lowest frequency, which is 5.15 GHz, in the second operating frequency band.

Specifically, as shown in FIG. 2, the second feeding portion 2 and the first end 41 of the grounding branch 40 meet (i.e., intersect or join) at a first connecting point P1, the second feeding portion 2 and the radiating element T meet at a second connecting point P2, and the grounding element 3 and the radiating element T meet at a connecting point P3. There is a first length L1 between the second feeding element S2 and the first connecting point P1, a second length L2 between the first connecting point P1 and the second connecting point P2, and a third length L3 between the second connecting point P2 and the third connecting point P3. In other words, the second feeding element S2, the first connecting point P1, the second connecting point P2, and the third connecting point P3 are respectively separate by the first length L1, the second length L2, and the third length L4. Thus, taking the second feeding element S2 as the start point and the ground plane G as the end point, the path length of the first antenna path is the sum of the first length L1, the second length L2, the third length L3, and the length of the grounding element 3. The path length of the second antenna path is the sum of the first length L1 and the length of the grounding branch 4.

Second Embodiment

Figure 3:
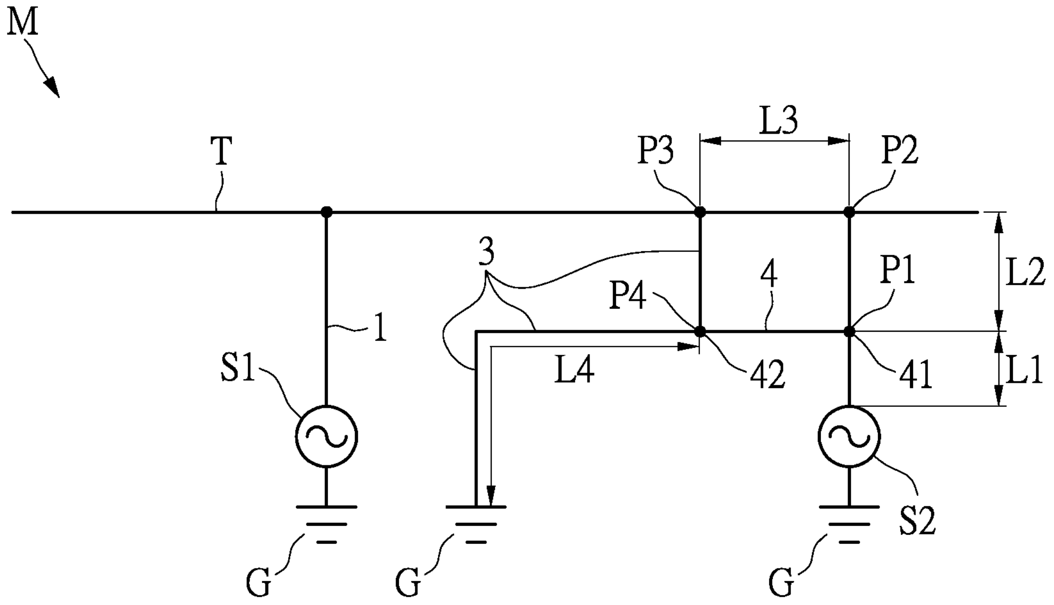
FIG. 3 is a schematic diagram of an antenna structure according to a second embodiment of the present disclosure.

Referring to FIG. 3, an antenna structure M according to a second embodiment of the present disclosure includes a radiating element T, a first feeding element S1, a second feeding element S2, a grounding element 3, and a grounding branch 4. The structural design of the antenna structure M shown in FIG. 3 is similar to that of the antenna structure M shown in FIG. 2, and the similarities in structure are not described herein. The main difference between the antenna structure M of FIG. 3 and the antenna structure M of FIG. 2 is the design of the grounding branch 4. In FIG. 3, the second end 42 of the grounding branch 4 is connected to the grounding element 3, which means the grounding branch 4 is connected with the ground plane G through the grounding element 3. Particularly, the second end 42 of the grounding branch 4 and the grounding element 3 meet at a fourth connecting point P4, and there is a fourth length L4, which separates the fourth connecting point P4 from the grounding element 3, between the fourth connecting point P4 and the end of the grounding element 3 that is connected with the ground plane G.

Hence, in this embodiment, the path length of the first antenna path is the sum of the first length L1, the second length L2, the third length L3, and the length of the grounding element 3. The path length of the second antenna path is the sum of the first length L1, the length of the grounding branch 4, and the fourth length L4.

Furthermore, another difference between the antenna structure M of FIG. 3 and the antenna structure M of FIG. 2 is that the first antenna of the antenna structure shown in FIG. 2 further includes the parasitic coupling element 5, but the first antenna of the antenna structure M shown in FIG. 3 does not. In other words, the first antenna of the antenna structure M in FIG. 3 is not a multiband antenna.

Third Embodiment

Figure 4:
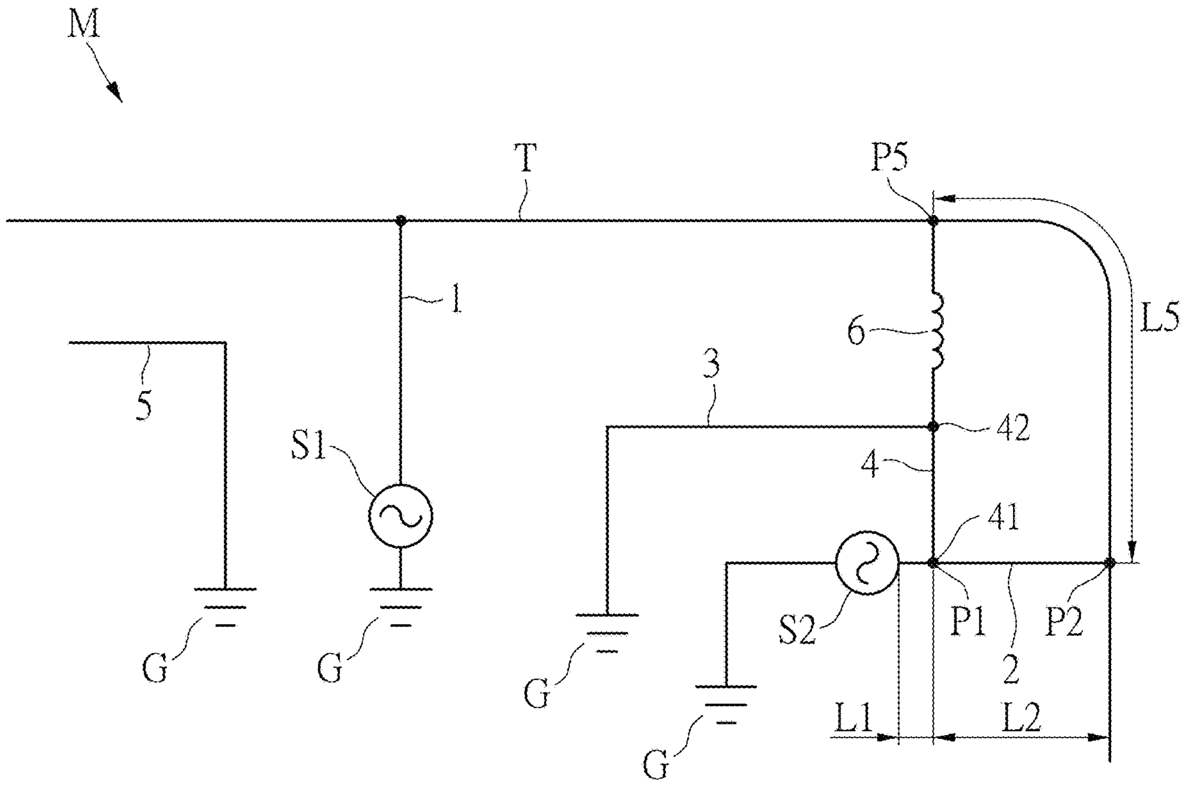
FIG. 4 is a schematic diagram of an antenna structure according to a third embodiment of the present disclosure.

Referring to FIG. 4, an antenna structure M according to a third embodiment of the present disclosure includes a radiating element T, a first feeding element S1, a second feeding element S2, a grounding element 3, and a grounding branch 4. The antenna structure M of FIG. 4 and the antenna structure M of FIG. 3 have similar structure design, and so the similarities in structure are not described herein. The main differences between the antenna structure M of FIG. 4 and the antenna structure M of FIG. 3 are that the radiating element T of the antenna structure M shown in FIG. 4 has a bending design, and that the antenna structure M of FIG. 4 further includes a parasitic coupling element 5 and an inductive element 6. The parasitic coupling element 5 is disposed close to the first feeding element S1, and compare to the second feeding element S2, the first feeding element S1 is closer to the parasitic coupling element 5 than the second feeding element S2 is. The first feeding element S1, the radiating element T, and the parasitic coupling element 5 form the first antenna. The first antenna adjusts its frequency range through coupling the parasitic coupling element 5 with the radiating element T. The inductive element 6 is connected between the radiating element T and the grounding element 3. It is clear from FIG. 2 to FIG. 4 that there is no restriction on the shape of the radiating element T in the antenna structure M of the present disclosure. The radiating element T can have a linear shape or an L shape with bend. Therefore, when the antenna structure M is disposed inside the electronic device D, the shape of the antenna structure M is adjustable in correspondence to location and space.

The inductive element 6 and the radiating element T meet at a fifth connecting point P5, and there is a fifth length L5 between the second connecting point P2 and the fifth connecting point P5 as the second connecting point P2 is separate from the fifth connecting point P5 by the fifth length L5. Thus, in this embodiment, the path length of the first antenna path is the sum of the first length L1, the second length L2, the fifth length L5, the length of the inductive element 6, and the length of the grounding element 3. The path length of the second antenna path is the sum of the first length L1, the length of the grounding branch 4, and the length of the grounding element 3. Through the placement of the inductive element 6, the antenna structure M of the present disclosure effectively shortens the path length of the first antenna path, thereby minimizing the overall length of the radiating element T, and as such the antenna structure M can be adjusted to fit the location and the space.

Beneficial Effects of the Embodiments

In conclusion, through the design of the grounding element 3 being located between the first feeding element S1 and the second feeding element S2 and the grounding branch 4 connecting with the second feeding portion 2, the first radiation pattern generated by the first feeding element S1 differs from the second radiation pattern generated by the second feeding element S2, and so the antenna structure M and the electronic device provided by the present disclosure can enhance the isolation between the first antenna and the second antenna.

More specifically, by placing the grounding element 3 between the first feeding element S1 and the second feeding element S2, the isolation of the antenna structure M of the present disclosure in the low frequency band (2.4 GHz to 2.5 GHz) is improved. Moreover, the isolation of the antenna structure M of the present disclosure in the high frequency band (5.15 GHz to 5.85 GHz) is improved by connecting the grounding branch 4 with the second feeding portion 2.

Figure 5:
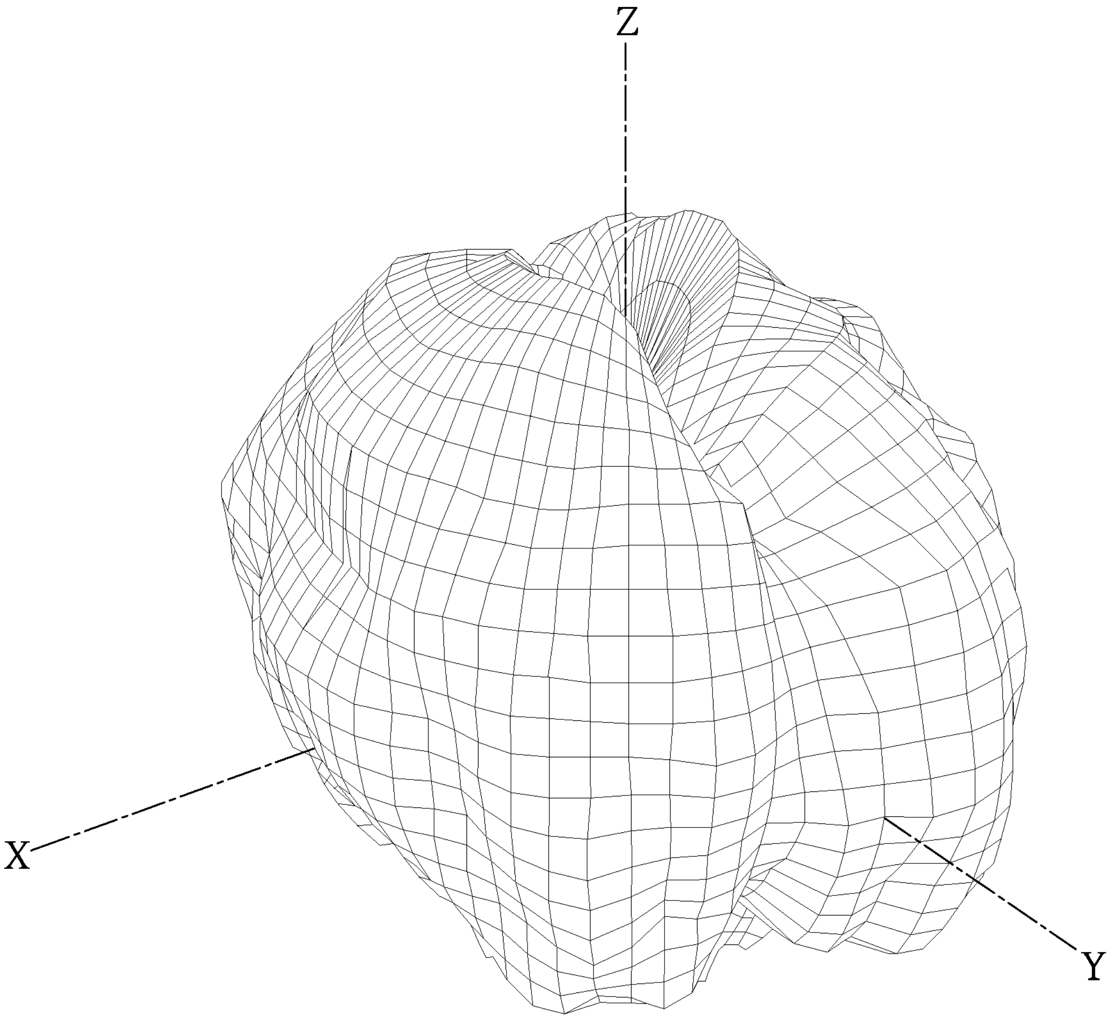
FIG. 5 is a schematic diagram illustrating a first radiation pattern generated by a first antenna of an antenna structure without grounding element and grounding branch and operating in a high frequency range.
Figure 6:
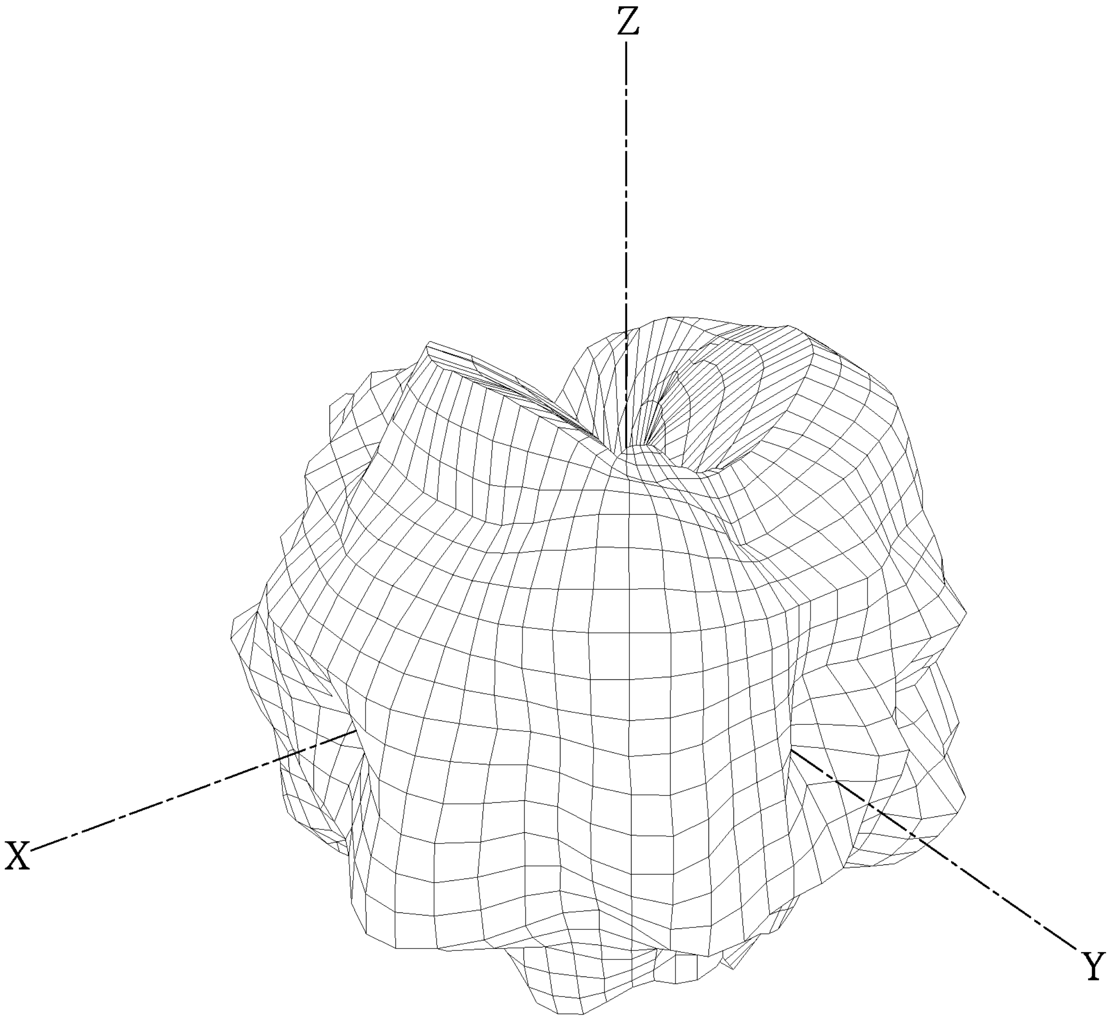
FIG. 6 is a schematic diagram illustrating a second radiation pattern generated by a second antenna of an antenna structure without grounding element and grounding branch and operating in a high frequency range.

Take the first antenna being a WWAN antenna and the second antenna being a WLAN antenna as an example. Referring to FIG. 5 and FIG. 6, when the antenna structure M is without the grounding element 3 and the grounding branch 4, the radiation patterns of the first antenna and the second antenna operating at high frequency are similar and both expand toward the x-axis direction, which means stronger radiant intensity in the x-axis direction. Because of the similarity in the radiation patterns, the signals of the first antenna and the second antenna generated at overlapping high frequency band will interfere with one another.

Figure 7:
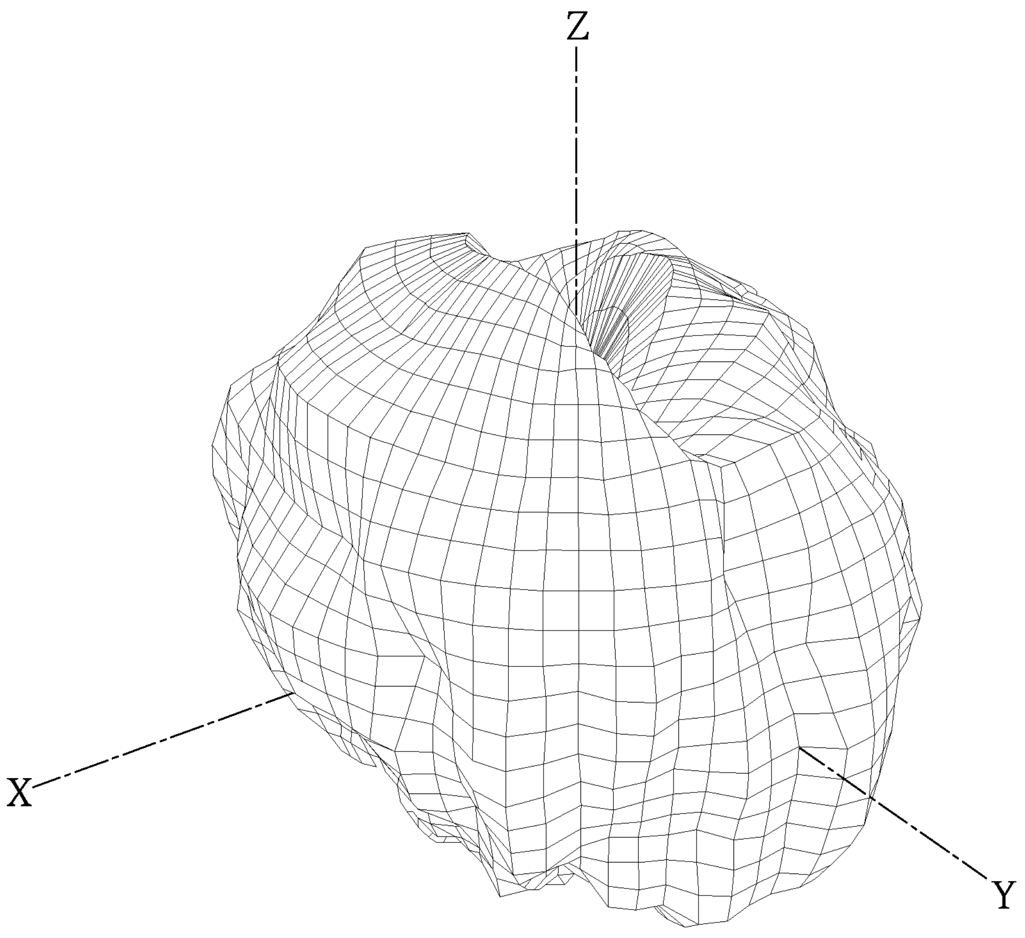
FIG. 7 is a schematic diagram illustrating a first radiation pattern generated by a first antenna of an antenna structure with grounding element and grounding branch and operating in a high frequency range according to the present disclosure.
Figure 8:
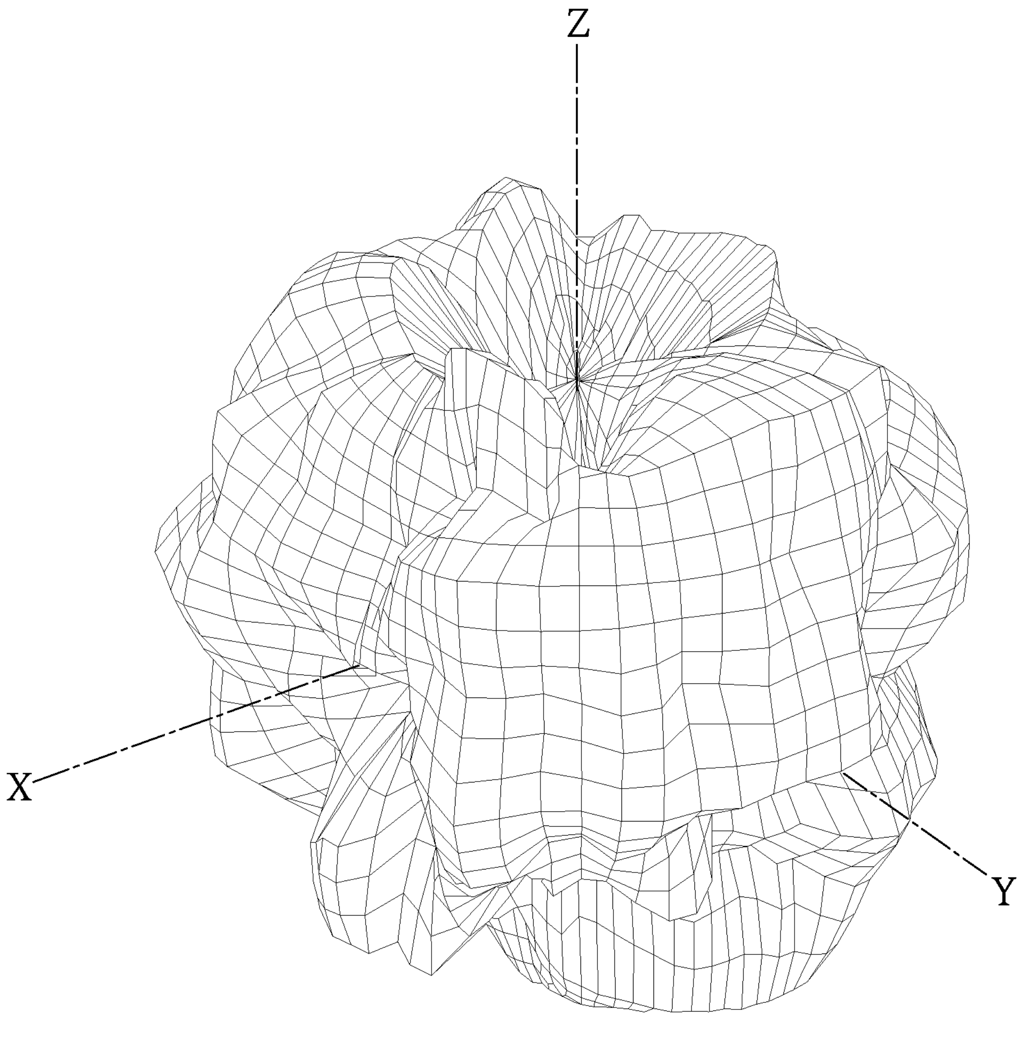
FIG. 8 is a schematic diagram illustrating a second antenna pattern generated by a second antenna of an antenna structure with grounding element and grounding branch and operating in a high frequency range according to the present disclosure.

Then, referring to FIG. 7 and FIG. 8, the radiation pattern of the second antenna has significantly changed after the addition of the grounding element 3 and the grounding branch 4 to the antenna structure M. Comparing FIG. 6 and FIG. 8, the radiation pattern of the second antenna expands toward the z-axis direction in FIG. 8 instead of toward the x-axis direction in FIG. 6. Hence, the radiation pattern of the second antenna and the radiation pattern of the first antenna are staggered, so that the signals generated by the first antenna and the second antenna in the overlapping high frequency range (5.15 GHz to 5.85 GHz) do not interfere with each other, and thereby enhancing the isolation between the first antenna and the second antenna.

It is to be noted that FIG. 7 and FIG. 8 illustrate the changes in the radiation patterns generated by the antenna structure M of the present disclosure in the high frequency band, and the radiation patterns generated by the antenna structure M of the present disclosure in the low frequency band would have similar changes and so are not described herein.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a radiating element;

a first feeding element having a first feeding portion, wherein the first feeding element is physically connected with the radiating element through the first feeding portion;

a second feeding element having a second feeding portion and connected with the radiating element through the second feeding portion;

a grounding element physically connected with the radiating element and located between the first feeding element and the second feeding element; and a grounding branch having a first end and a second end, wherein the first end is physically connected with the second feeding portion, the second end is connected with the grounding element, and the second end is connected with a ground plane through the grounding element;

wherein the first feeding element is used for feeding a signal to excite the radiating element to generate a first radiation pattern, the second feeding element is used for feeding another signal to excite the radiating element to generate a second radiation pattern, and the first radiation pattern is different from the second radiation pattern.

2. The antenna structure according to claim 1, wherein the second feeding element and the radiating element form a wireless local area network (WLAN) antenna that is configured to generate a first operating frequency band and a second operating frequency band, and the first operating frequency band is lower than the second operating frequency band.

3. The antenna structure according to claim 2, wherein a first antenna path is formed when the WLAN antenna generates the first operating frequency band, a second antenna path is formed when the WLAN antenna generates the second operating frequency band, a path length of the first antenna path is equal to one half of a wavelength of a lowest frequency in the first operating frequency band, and a path length of the second antenna path is equal to one half of a wavelength of a lowest frequency in the second operating frequency band.

4. The antenna structure according to claim 1, wherein the second feeding portion and the first end of the grounding branch meet at a first connecting point, the second feeding portion and the radiating element meet at a second connecting point, the grounding element and the radiating element meet at a third connecting point, the second end of the grounding branch and the grounding element meet at a fourth connecting point, the second feeding element is separated from the first connecting point by a first length, the first connecting point is separated from the second connecting point by a second length, the second connecting point is separated from the third connection point by a third length, and the fourth connecting point is separated from one end of the grounding element that is connected with the ground plane by a fourth length; and wherein the path length of the first antenna path is a sum of the first length, the second length, the third length, and a length of the grounding element, and the path length of the second antenna path is a sum of the first length, a length of the grounding branch, and the fourth length.

5. The antenna structure according to claim 1, further comprising an inductive element connected between the radiating element and the grounding element.

6. The antenna structure according to claim 5, wherein the second feeding portion and the first end of the grounding branch meet at a first connecting point, the second feeding portion and the radiating element meet at a second connecting point, one end of the inductive element and the radiating element meet at a fifth connecting point, another end of the inductive element is physically connected with the second end of the grounding branch, the second feeding element is separated from the first connecting point by a first length, the first connecting point is separated from the second connecting point by a second length, and the second connecting point is separated from the fifth connecting point by a fifth length; and wherein the path length of the first antenna path is a sum of the first length, the second length, the fifth length, a length of inductive element, and a length of the grounding element, and the path length of the second antenna path is a sum of the first length, a length of the grounding branch, and a length of the grounding element.

7. The antenna structure according to claim 1, further comprising a parasitic coupling element disposed adjacent to the first feeding element, the first feeding element, the radiating element, and the parasitic coupling element form a multiband antenna, and the multiband antenna is configured to generate a frequency range that is adjustable by coupling the parasitic coupling element with the radiating element.

8. An electronic device, comprising:

a housing; and an antenna structure disposed in the housing, the antenna structure comprising:

a radiating element;

a first feeding element having a first feeding portion, wherein the first feeding element is physically connected with the radiating element through the first feeding portion;

a second feeding element having a second feeding portion and connected with the radiating element through the second feeding portion;

a grounding element physically connected with the radiating element and located between the first feeding element and the second feeding element; and a grounding branch having a first end and a second end, wherein the first end is physically connected with the second feeding portion, the second end is connected with the grounding element, the second end is connected with a ground plane through the grounding element, and the ground plane is electrically connected with the housing;

wherein the first feeding element is used for feeding a signal to excite the radiating element to generate a first radiation pattern, the second feeding element is used for feeding another signal to excite the radiating element to generate a second radiation pattern, and the first radiation pattern is different from the second radiation pattern.

9. The electronic device according to claim 8, wherein the second feeding element and the radiating element form a wireless local area network (WLAN) antenna that is configured to generate a first operating frequency band and a second operating frequency band, and the first operating frequency band is lower than the second operating frequency band.

10. The electronic device according to claim 9, wherein a first antenna path is formed when the WLAN antenna generates the first operating frequency band, a second antenna path is formed when the WLAN antenna generates the second operating frequency band, a path length of the first antenna path is equal to one half of a wavelength of a lowest frequency in the first operating frequency band, and a path length of the second antenna path is equal to one half of a wavelength of a lowest frequency in the second operating frequency band.

11. The electronic device according to claim 8, wherein the second feeding portion and the first end of the grounding branch meet at a first connecting point, the second feeding portion and the radiating element meet at a second connecting point, the grounding element and the radiating element meet at a third connecting point, the second end of the grounding branch and the grounding element meet at a fourth connecting point, the second feeding element is separated from the first connecting point by a first length, the first connecting point is separated from the second connecting point by a second length, the second connecting point is separated from the third connecting point by a third length, and the fourth connecting point is separated from one end of the grounding element that is connected with the ground plane by a fourth length; and wherein the path length of the first antenna path is a sum of the first length, the second length, the third length, and a length of the grounding element, and the path length of the second antenna path is a sum of the first length, a length of the grounding branch, and the fourth length.

12. The electronic device according to claim 8, further comprising an inductive element connected between the radiating element and the grounding element.

13. The electronic device according to claim 12, wherein the second feeding portion and the first end of the grounding branch meet at a first connecting point, the second feeding portion and the radiating element meet at a second connecting point, one end of the inductive element and the radiating element meet at a fifth connecting point, another end of the inductive element is physically connected with the second end of the grounding branch, the second feeding element is separated from the first connecting point by a first length, the first connecting point is separated from the second connecting point by a second length, and the second connecting point is separated from the fifth connecting point by a fifth length; and wherein the path length of the first antenna path is a sum of the first length, the second length, the fifth length, a length of the inductive element, and a length of the grounding element, and the path length of the second antenna path is a sum of the first length, a length of the grounding branch, and a length of the grounding element.

14. The electronic device according to claim 8, further comprising a parasitic coupling element disposed adjacent to the first feeding element, the first feeding element, the radiating element, and the parasitic coupling element form a multiband antenna, and the multiband antenna is configured to generate a frequency range that is adjustable by coupling the parasitic coupling element with the radiating element.

* * * * *